US008108142B2

(12) United States Patent
Dupont et al.

(10) Patent No.: US 8,108,142 B2
(45) Date of Patent: Jan. 31, 2012

(54) 3D NAVIGATION SYSTEM FOR MOTOR VEHICLES

(75) Inventors: Cedric Dupont, San Francisco, CA (US); Carsten Bergmann, San Jose, CA (US); Arne Stoschek, Palo Alto, CA (US); Carlo Rummel, Palo Alto, CA (US)

(73) Assignee: Volkswagen AG, Wolfsburg (DE)

( * ) Notice: Subject to any disclaimer, the term of this patent is extended or adjusted under 35 U.S.C. 154(b) by 587 days.

(21) Appl. No.: 11/334,854

(22) Filed: Jan. 19, 2006

(65) Prior Publication Data

US 2006/0164412 A1     Jul. 27, 2006

Related U.S. Application Data

(60) Provisional application No. 60/647,350, filed on Jan. 26, 2005.

(51) Int. Cl.
*G01C 21/00* (2006.01)
*G01C 21/26* (2006.01)
*G01C 21/34* (2006.01)
*G01C 21/20* (2006.01)
*G01C 21/36* (2006.01)

(52) U.S. Cl. ........ 701/211; 701/200; 701/207; 701/208; 701/209; 701/213

(58) Field of Classification Search .......... 701/200–226, 701/50, 117, 300, 301; 348/149, 113–120, 348/148; 340/995.1, 995.14; 345/419, 427
See application file for complete search history.

(56) References Cited

U.S. PATENT DOCUMENTS

| | | | | |
|---|---|---|---|---|
| 5,115,398 A | * | 5/1992 | De Jong | 701/200 |
| 5,522,018 A | * | 5/1996 | Takeda et al. | 345/422 |
| 5,793,310 A | * | 8/1998 | Watanabe et al. | 340/995.14 |
| 5,859,666 A | * | 1/1999 | Manabe | 348/231.9 |
| 5,917,436 A | * | 6/1999 | Endo et al. | 340/995.14 |
| 5,941,932 A | * | 8/1999 | Aikawa et al. | 701/208 |
| 5,964,810 A | * | 10/1999 | Hirano et al. | 701/28 |
| 5,983,161 A | * | 11/1999 | Lemelson et al. | 701/301 |
| 6,011,494 A | * | 1/2000 | Watanabe et al. | 340/995.14 |
| 6,169,552 B1 | * | 1/2001 | Endo et al. | 345/427 |

(Continued)

FOREIGN PATENT DOCUMENTS

WO    WO 2004048895 A1 *    6/2004

OTHER PUBLICATIONS

"Stored Geocast" by C. Maihofer et al., Proceedings of Communication in Distributed Systems, Leipzig 2003.*

(Continued)

*Primary Examiner* — Khoi Tran
*Assistant Examiner* — Dale Moyer
(74) *Attorney, Agent, or Firm* — King & Spalding L.L.P.

(57) ABSTRACT

A 3D navigation system for motor vehicles includes a set-up combining a first motor vehicle and an environment scanner to generate a three-dimensional image of an environment around the first motor vehicle or at least a part of the environment around the first motor vehicle as well as at least a second motor vehicle and a communications connection between the first motor vehicle and the second motor vehicle for transmitting the three-dimensional image of the environment around the first motor vehicle or at least a part of the environment around the first motor vehicle to the second motor vehicle.

8 Claims, 6 Drawing Sheets

U.S. PATENT DOCUMENTS

| | | | |
|---|---|---|---|
| 6,182,010 B1* | 1/2001 | Berstis | 701/211 |
| 6,201,544 B1* | 3/2001 | Ezaki | 345/419 |
| 6,222,583 B1* | 4/2001 | Matsumura et al. | 348/113 |
| 6,233,523 B1* | 5/2001 | Sood | 701/213 |
| 6,278,383 B1* | 8/2001 | Endo et al. | 340/995.14 |
| 6,285,317 B1* | 9/2001 | Ong | 342/357.13 |
| 6,356,840 B2* | 3/2002 | Kusama | 701/211 |
| 6,405,132 B1* | 6/2002 | Breed et al. | 701/301 |
| 6,593,926 B1* | 7/2003 | Yamaguchi et al. | 345/427 |
| 6,611,753 B1* | 8/2003 | Millington | 701/209 |
| 2001/0039474 A1* | 11/2001 | Hayashi et al. | 701/208 |
| 2002/0011941 A1* | 1/2002 | Endo et al. | 340/995 |
| 2002/0013659 A1* | 1/2002 | Kusama | 701/211 |
| 2002/0049529 A1* | 4/2002 | Ikeda | 701/200 |
| 2002/0128770 A1* | 9/2002 | Ooishi | 701/207 |
| 2002/0167589 A1* | 11/2002 | Schofield et al. | 348/148 |
| 2002/0173907 A1* | 11/2002 | Ando | 701/209 |
| 2003/0105587 A1* | 6/2003 | Kim | 701/214 |
| 2003/0125854 A1* | 7/2003 | Kawasaki et al. | 701/35 |
| 2003/0214582 A1* | 11/2003 | Takahashi et al. | 348/116 |
| 2004/0049341 A1* | 3/2004 | Fujiwara | 701/210 |
| 2004/0073337 A1* | 4/2004 | McKee et al. | 700/245 |
| 2004/0236506 A1* | 11/2004 | Kolb et al. | 701/208 |
| 2004/0252192 A1* | 12/2004 | Adachi et al. | 348/148 |
| 2005/0065721 A1* | 3/2005 | Herrtwich et al. | 701/207 |
| 2005/0125115 A1* | 6/2005 | Hiwatashi et al. | 701/25 |
| 2005/0209776 A1* | 9/2005 | Ogino | 701/211 |
| 2005/0231340 A1* | 10/2005 | Tauchi | 340/435 |
| 2006/0164416 A1* | 7/2006 | Lee et al. | 345/427 |
| 2007/0192020 A1* | 8/2007 | Brulle-Drews et al. | 701/200 |
| 2008/0186210 A1* | 8/2008 | Tseng | 340/995.26 |
| 2008/0195315 A1* | 8/2008 | Hu et al. | 701/212 |
| 2008/0243378 A1* | 10/2008 | Zavoli | 701/209 |
| 2009/0005961 A1* | 1/2009 | Grabowski et al. | 701/200 |
| 2009/0037103 A1* | 2/2009 | Herbst et al. | 701/211 |
| 2009/0228204 A1* | 9/2009 | Zavoli et al. | 701/208 |
| 2010/0235080 A1* | 9/2010 | Faenger et al. | 701/200 |

OTHER PUBLICATIONS

Press Article for Siemens VDO; www.siemensvdo.com/com/pressarticle2001.asp?ArticleID=09004e.*

Press Article for Siemens VDO; www.siemensvdo.com/xt-inc/pressarticles/docs/2001/iaa/09004e.doc.* www.siemensvdo.com/com/pressarticle2001. asp?ArticieID=09004e, 2 pgs, Sep. 11, 2001.

www.siemensvdo.comxt-inc/pressarticles/docs/2001/iaa/09004e. doc, Sep. 11, 2001.

"Geocast in Vehicular Environments: Caching and Transmission Range Control for Improved Efficiency" by C. Maihöfer, R. Eberhard, Intelligent Vehicles Symposium, 6 pgs, Jun., 2004.

A survey on geocast routing protocols by C. Maihöfer, IEEE, Communications Surveys and Tutorials, $2^{nd}$ quarter issue, pp. 1-15, 2004.

"Stored geocast" by C. Maihöfer, W. Franz, R. Eberhardt, Proceedings of Communication in Distributed Systems (KiVS), Leipzig, pp. 257-268, Feb. 2003.

Karp, Brad et al., "Greedy perimeter stateless routing for wireless networks," MobiCom 2000, pp. 45-56, 2000.

* cited by examiner

3D NAVIGATION SYSTEM FOR MOTOR VEHICLES

CROSS-REFERENCE TO RELATED APPLICATIONS

This application claims the benefit of U.S. Provisional Application No. 60/647,350 filed on Jan. 26, 2005, entitled "SYSTEM ZUR 3D-NAVIGATION FÜR KRAFTFAHRZEUGE", the contents of which are hereby incorporated in their entirety by reference.

TECHNICAL FIELD

The invention concerns a 3D navigation system for motor vehicles.

SUMMARY

The purpose of the invention is to improve the 3D navigation for motor vehicles.

The afore-mentioned purpose can be achieved by a 3D navigation system that comprises a combination of a first motor vehicle and an environment scanner for generating a three-dimensional image of an environment of/around the first motor vehicle or at last a part of the environment of/around the first motor vehicle as well as at least a second motor vehicle and a communications connection between the first motor vehicle and the second motor vehicle for transmitting the three-dimensional image of the environment of/around the first motor vehicle or at last a part of the environment of/around the first motor vehicle to the second motor vehicle.

3D navigation in the sense of the invention makes it in particular possible to show a 3-dimensional image of a landscape or environment. This is different in particular from a so-called 3-dimensional depiction of a 2-dimentsional image, thus from looking at a 2-dimensional image from the bird's eye perspective. Such a depiction, often also described as 3D navigation, must not be confused with a 3D navigation in the sense of the invention.

An environment of/around a motor vehicle in the sense of the invention is above all an area around the motor vehicle scanned by an environment scanner of the motor vehicle and/or an area around the motor vehicle visible from the motor vehicle.

A 3-dimensional image of an environment or an area in the sense of the invention includes in particular only non-moving objects in the environment of the motor vehicle or in the area. A 3-dimensional image of an environment or an area in the sense of the invention is above all not a photographic depiction but specifically a simplified image that might show only the outlines of objects in the environment of the motor vehicle or in the area. A 3-dimensional image of an environment or an area in the sense of the invention may also be an image that indicates details between a photographic 3-dimensional image of objects in the environment of the motor vehicle or in the area and outlines of these objects.

A communications connection between the first motor vehicle and the second motor vehicle or a communications connection between two motor vehicle indicated in what follows is e.g. a vehicle-to-vehicle communications connection that does not need stationary communications nodes. Details of a suitable vehicle-to-vehicle communication without stationary communications nodes are e.g. disclosed in the article "Car-to-car Communication" by M. Bleyer, S. Waldenmaier, Funkschau (Radio Review) April 2002, pages 16-19. The communication between vehicles that are not necessarily in the mutual reception area, is established by routing the communication by way of a suitable forwarding/routing method through other, vehicles of the communications setup. In the process, according to the article "Geocast in Vehicular Environments: Caching and Transmission Range Control for Improved Efficiency" by C. Maihöfer, R. Eberhard, Intelligent Vehicles Symposium (Jun. 14-17, 2004), in Parma, arrangements can be made to emit so-called beacons that indicate the position of the transmitting motor vehicle.

Other details about car-to-car communication or the respective forwarding/routing method can be found in the articles cited in the afore-mentioned article "A survey on geocast routing protocols" by C. Maihöfer, IEEE, Communications Surveys and Tutorials, $2^{nd}$ quarter issue, 2004, "Stored geocast" by C. Maihöfer, W. Franz, R. Eberhardt, Proceedings of Communication in Distributed Systems (KiVS), Leipzig, February 2003, pages 257-268, Springer Verlag (Publisher) and "Greedy perimeter stateless routing for wireless networks" by B.

Karp, H. T. Kung, Proceedings of the Sixth ACM/IEEE International Conference on Mobile Computing and Networking (MobiCom 2000), Boston, USA, August 2000, pages 243-254.

In an embodiment of the invention the setup or combination comprises at least twenty, preferably one hundred motor vehicles with on environment scanner each for generating a 3-dimensional image of an environment of the respective motor vehicle or at least a part of the environment of the respective motor vehicle.

In another embodiment of the invention the 3D navigation system includes also a stationary base station and a communications connection between the first motor vehicle and the stationary base station for transmitting the 3-dimensional image of the environment of the first motor vehicle or at least a part of the environment of the first motor vehicle to the stationary base station.

In another embodiment of the invention the second motor vehicle includes a communications connection between the second motor vehicle and the stationary base station for transmitting the 3-dimensional image of an area around the second motor vehicle to the second motor vehicle.

An area around a motor vehicle in the sense of the invention may correspond to an environment of the motor vehicle in the sense of the invention. However, an area around a motor vehicle in the sense of the invention is in particular an area going beyond the environment of the motor vehicle. An area around a motor vehicle in the sense of the invention may be a borough of a city or an area similar to it, a town or an area similar to it, a county or an area similar to it, a federal state or an area similar to it and/or a country or an area similar to it.

In another embodiment of the invention the second motor vehicle includes a database of the 3-dimensional image of the area around the second motor vehicle.

In another embodiment of the invention the second motor vehicle includes a navigation module for updating the database after receiving a 3-dimensional image of an area around the second motor vehicle and/or a 3-dimensional image of the environment of the first motor vehicle or at least a part of the environment of the first motor vehicle.

In another embodiment of the invention the second motor vehicle includes a display device for displaying a 3-dimensional image, in particular an updated one, of the environment of the second motor vehicle or at least a part of the environment of the second motor vehicle.

The afore-mentioned purpose is achieved—in particular in connection with one or more of the aforementioned characteristics—by a method of 3D navigation whereby a 3-dimensional image of an environment of a first motor vehicle or at least a part of the environment of the first motor vehicle is generated, and whereby the 3-dimensional image of the environment of the first motor vehicle or at least a part of the environment of the first motor vehicle is transmitted to at least one second motor vehicle, in particular via a communications connection between the first motor vehicle and the second motor vehicle.

In an embodiment of the invention a database is updated by receiving a 3-dimensional image of an area around the second motor vehicle from a stationary base station and/or a 3-dimensional image of the environment of the first motor vehicle or at least a part of the environment of the first motor vehicle, in particular of the first motor vehicle.

In another embodiment of the invention a 3-dimensional image, in particular an updated one, of the enviromnent of the second motor vehicle or at least a part of the environment of the second motor vehicle is displayed with the help of a display device mounted in the second motor vehicle.

The afore-mentioned purpose is also achieved—in particular in connection with one or more of the afore-mentioned characteristics—by a method of 3D navigation whereby a 3-dimensional image of an environment of a first motor vehicle or at least a part of the environment of the first motor vehicle is generated, whereby a 3-dimensional image of an environment of a second motor vehicle or at least a part of the environment of the second motor vehicle is generated, whereby the 3-dimensional image of the environment of the first motor vehicle or at least of a part of the environment of the first motor vehicle as well as the 3-dimensional image of the environment of the second motor vehicle or at least a part of the environment of the second motor vehicle is transmitted to a stationary base station, and whereby a database assigned to the stationary base station is updated after receiving a 3-dimensional image of the environment of the first motor vehicle or a part of the environment of the first motor vehicle, provided that the received image of the environment of the first motor vehicle or a part of the environment of the first motor vehicle differs from the corresponding 3-dimensional image of the environment of the first motor vehicle or at least a part of the environment of the first motor vehicle stored in the database in the same way as a 3-dimensional image of the same environment recorded (and transmitted) by the second motor vehicle before a certain waiting period. The waiting period may be 'zero' but is preferably longer than 15 min, in particular longer than 60 min.

The afore-mentioned purpose is also achieved—in particular in connection with one or more of the afore-mentioned characteristics—by a 3D navigation system for motor vehicles whereby the 3D navigation system includes a setup or combination of at least twenty, preferably one hundred motor vehicles with one environment scanner each for generating a 3-dimensional image of the environment of the respective motor vehicle or at least a part of the environment of the respective motor vehicle, and a communications connection between each motor vehicle and a stationary base station for transmitting the 3-dimensional image of the environment of the respective motor vehicle or at least a part of the environment of the respective motor vehicle to the stationary base station.

In an embodiment of the invention the stationary base stations includes a database of a 3-dimensional image of an area and a navigation module for updating the database after receiving a 3-dimensional image of the environment of a motor vehicle or at least part of the environment of the motor vehicle.

In another embodiment of the invention the stationary base stations includes a database of a 3-dimensional image of an area and a navigation module for updating the database after receiving a 3-dimensional image of the environment of a motor vehicle or at least part of the environment of the motor vehicle, provided that the received 3-dimensional image of the environment of the motor vehicle or at least a part of the environment of the motor vehicle differs from the corresponding 3-dimensional image of the environment of the motor vehicle or at least a part of the environment of the motor vehicle stored in the database in the same way as a 3-dimensional image of the same environment recorded (and transmitted) by another motor vehicle before a certain waiting period.

Motor vehicles in the sense of the invention are in particular land vehicles individually used in road traffic. Motor vehicles in the sense of the invention are in particular land vehicles with a combustion motor.

Other advantages and details are shown in the following description of the examples of embodiment.

DETAILED DESCRIPTION

Figure 1:
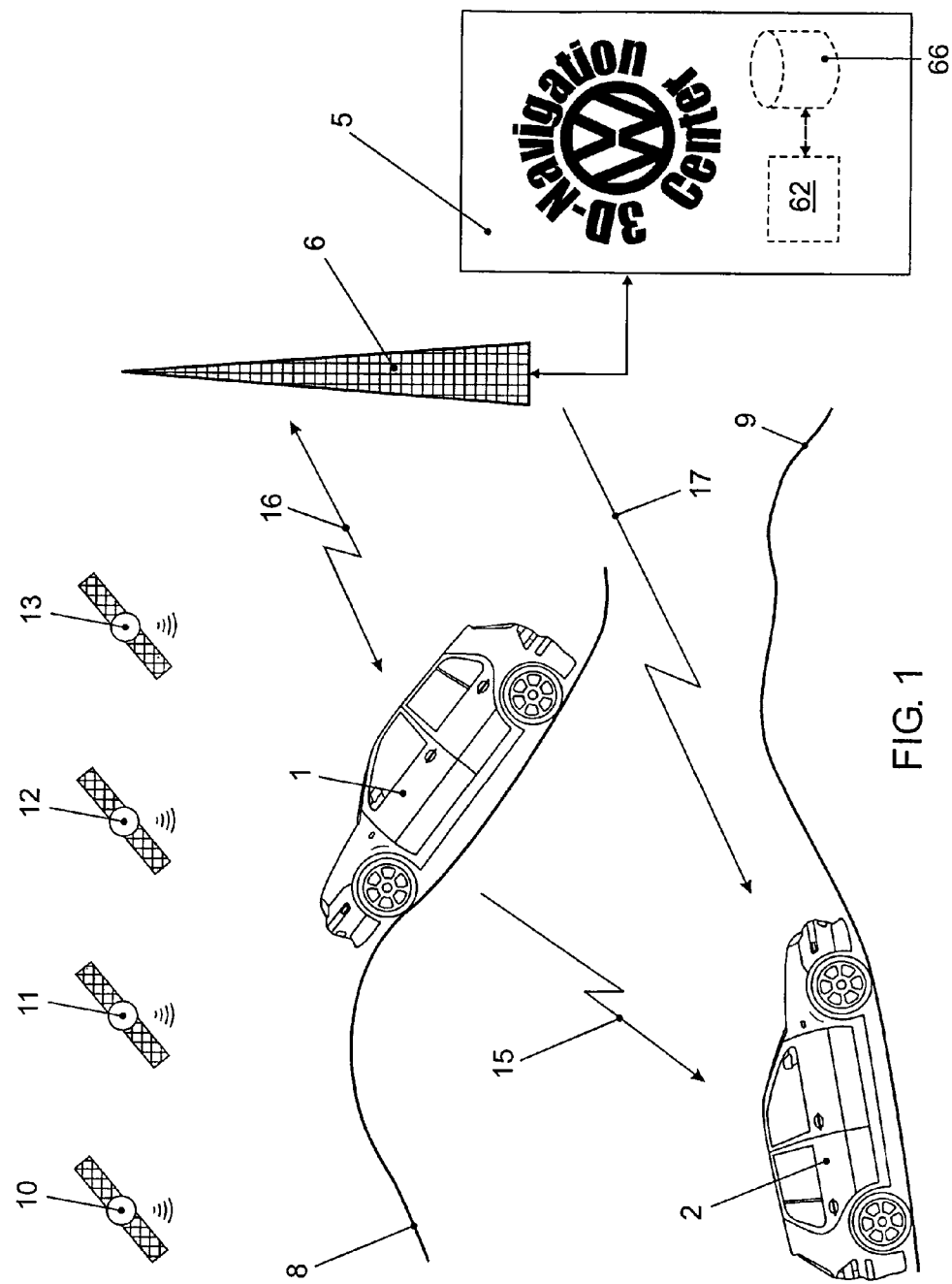
FIG. 1 shows an example of embodiment of a 3D navigation system for motor vehicles.
Figure 2:
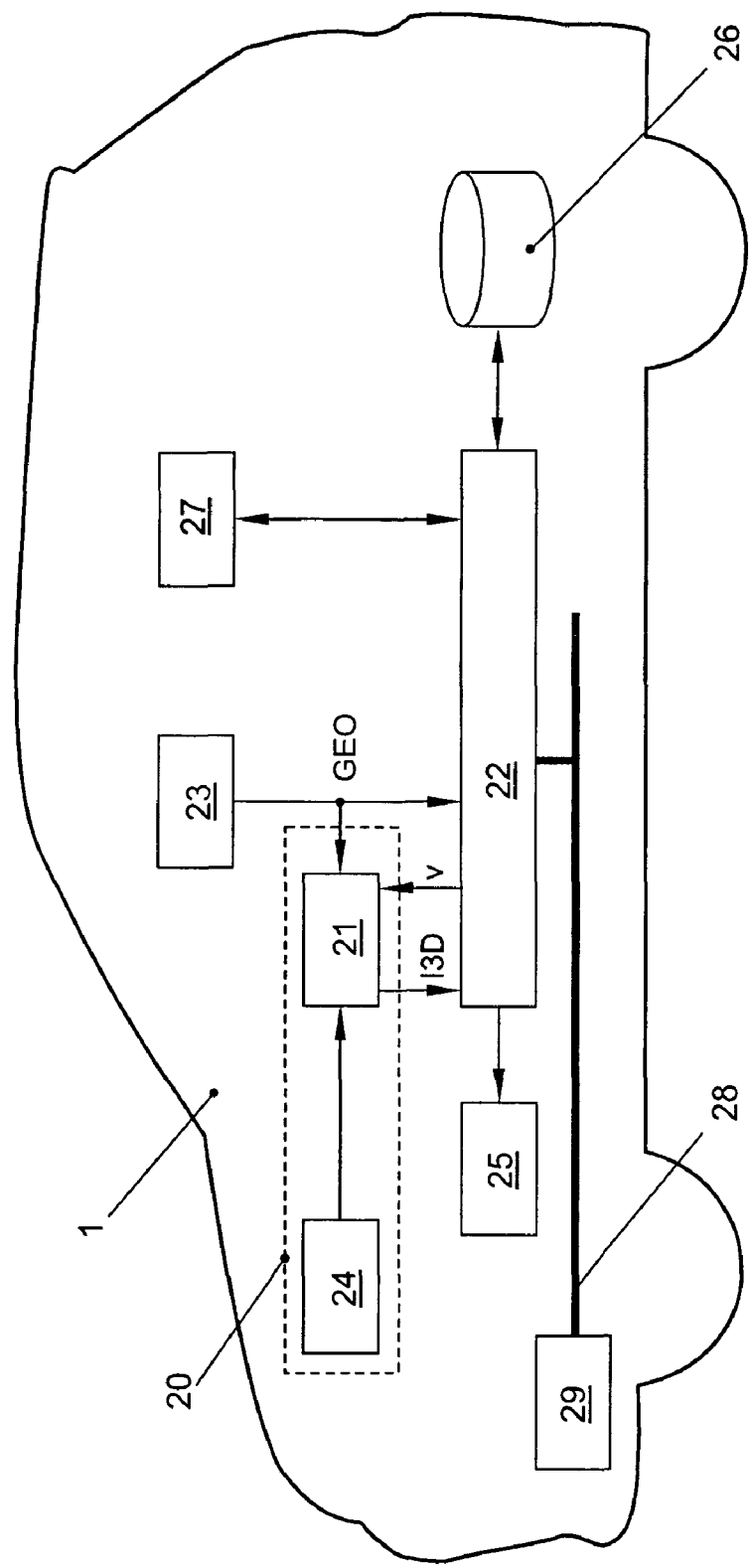
FIG. 2 shows the principle of an example of embodiment of a motor vehicle with a 3D navigation system for motor vehicles.

FIG. 1 shows an example of embodiment of a 3D navigation system for motor vehicles. The 3D navigation system for motor vehicles includes a setup or combination combining of at least twenty, preferably one hundred motor vehicles according to the motor vehicle indicated by reference 1. FIG. 2 shows an example of the motor vehicle 1.

The motor vehicle 1 includes a positioning system 23, e.g. in the form of a GPS positioning system, based on signals from satellites 10, 11, 12, 13 for determining the GEO location of the motor vehicle 1. The motor vehicle 1 also includes an environment scanner 20 for generating a 3-dimensional image I3D of an environment 8 of the motor vehicle 1 or at least of a part of the environment 8 of the motor vehicle 1. The environment scanner 20 includes a sensor 24 and an analyzer 21. The sensor 24 may include a camera, a stereo camera, a laser scanner, LIDAR or a radar device, in particular a radar device for determining a differential speed, a distance and an angle between an object and the motor vehicle 1. A suitable laser scanner may e.g. be ordered from SICK AG, Sebastian-Kneipp-Str. 1, 79183 Waldkirch, Federal Republic of Germany. An environment of the motor vehicle 1 in the sense of the invention is in particular an area in front of the motor vehicle 1 or around the motor vehicle 1 that can be scanned by the environment scanner 20 or the sensor 24.

The analyzer 21 is used first to determine the speed of the objects recognized by the sensor 24 in the environment 8 of the motor vehicle 1 via the speed v of the motor vehicle 1.

Depending on the GEO location of the motor vehicle 1, the analyzer 21 prepares, from the objects at rest in the environment 8 of the motor vehicle 1, a 3-dimensional image I3D of the environment 8 of the motor vehicle 1 or at least a part of the environment 8 of the motor vehicle 1. A suitable method is e.g. shown in the article "Fusion of Realities for Vehicle Navigation" by Zhencheng Hu, Keiichi Uchimura and Hanqing Lu which can be retrieved from the Internet.

The motor vehicle 1 includes also a navigation module 22. In a simple embodiment the navigation module 22 includes an interface to the bus system 28 through which the speed v of the motor vehicle 1 can be transmitted by a motor vehicle control 29 to the navigation module 22, and an interface to a communications device 27. With the communications device 27 a communications connection 15 can be established between the motor vehicle 1 and another motor vehicle indicated by reference 2 for transmitting the 3-dimensional image I3D of the environment 8 of the motor vehicle 1 or at least a part of the environment 8 of the motor vehicle 1 to the motor vehicle 2. In addition, a communications connection 16 can be established via the communications device 27 between the motor vehicle 1 and a stationary base station 5 for transmitting the 3-dimensional image I3D of the environment 8 of the motor vehicle 1 or at least a part of the environment 8 of the motor vehicle 1 to the stationary base station 5. The stationary base station 5 also includes e.g. an antenna indicated by reference 6.

The present example of embodiment also provides that the motor vehicle 1 includes a database 26 of the 3-dimensional image of an area around the motor vehicle 1. An area around the motor vehicle 1 may be an environment of the motor vehicle 1. However, an area around the motor vehicle 1 is in particular an area going beyond the environment of the motor vehicle 1. An area around the motor vehicle 1 may the borough of a city or an area similar to it, a town or an area similar to it, a county or an area similar to it, a federal state or an area similar to it and/or a country or an area similar to it. In the present example of embodiment the navigation module 22 serves also for administering or for updating the database 26 described in FIG. 3. According to the present example of embodiment the motor vehicle 1 also includes a display device 25, an example of which is shown in FIG. 4, for displaying an image of the environment 8 of the motor vehicle 1 or at least a part of the environment 8 of the motor vehicle 1 and/or for displaying an image of an area around the motor vehicle 1 or at least a part of the area around the motor vehicle 1. The large image displayed here in FIG. 4 by the display device 25 is an example of embodiment of an image of the environment 8 of the motor vehicle 1 or at least a part of the environment 8 of the motor vehicle 1, and the small image displayed in FIG. 4 by the display device 25 is an example of embodiment of an image of an area around the motor vehicle 1 or at least a part of the area around the motor vehicle 1.

Figure 3:
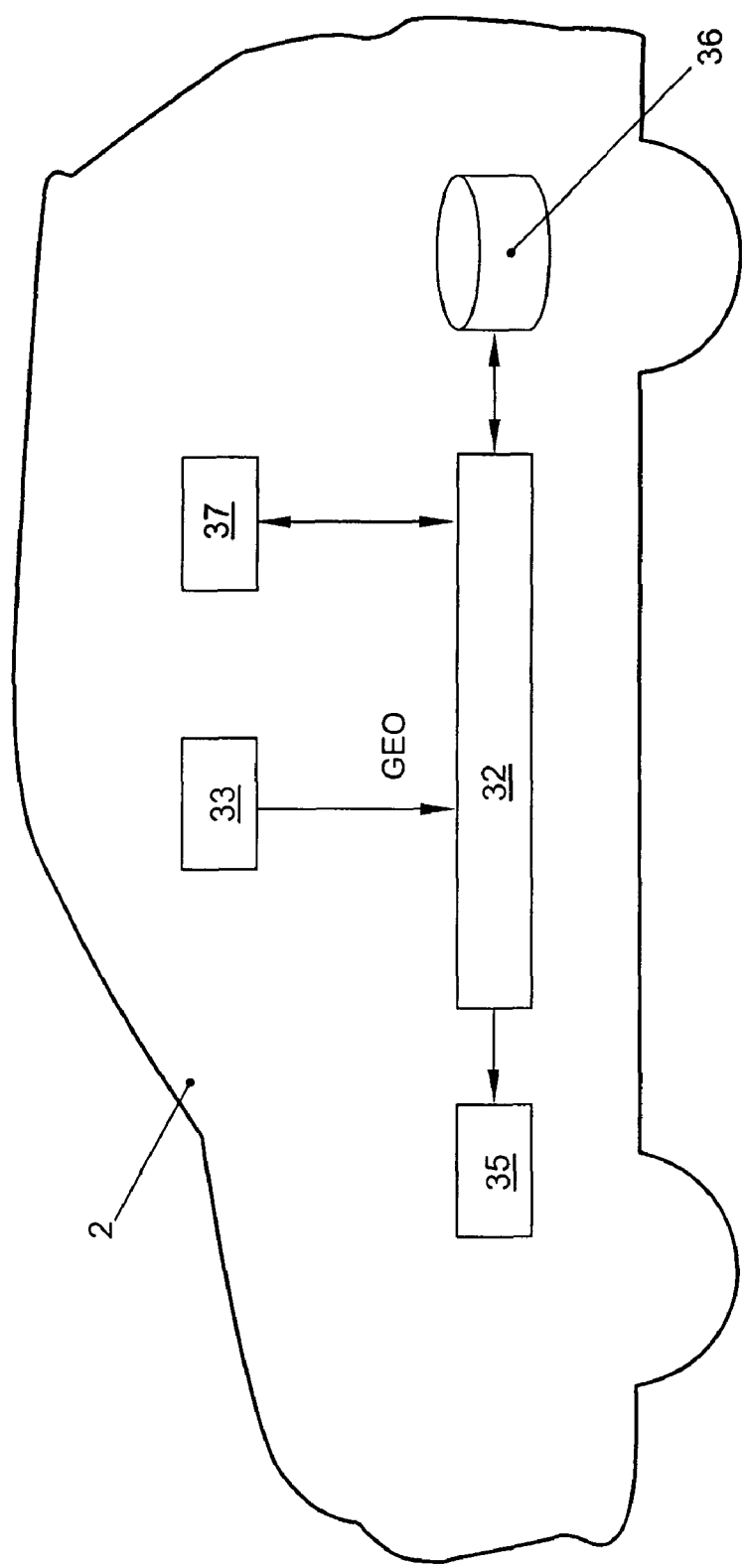
FIG. 3 shows the principle of another example of embodiment of a motor vehicle with a 3D navigation system for motor vehicles.
Figure 4:
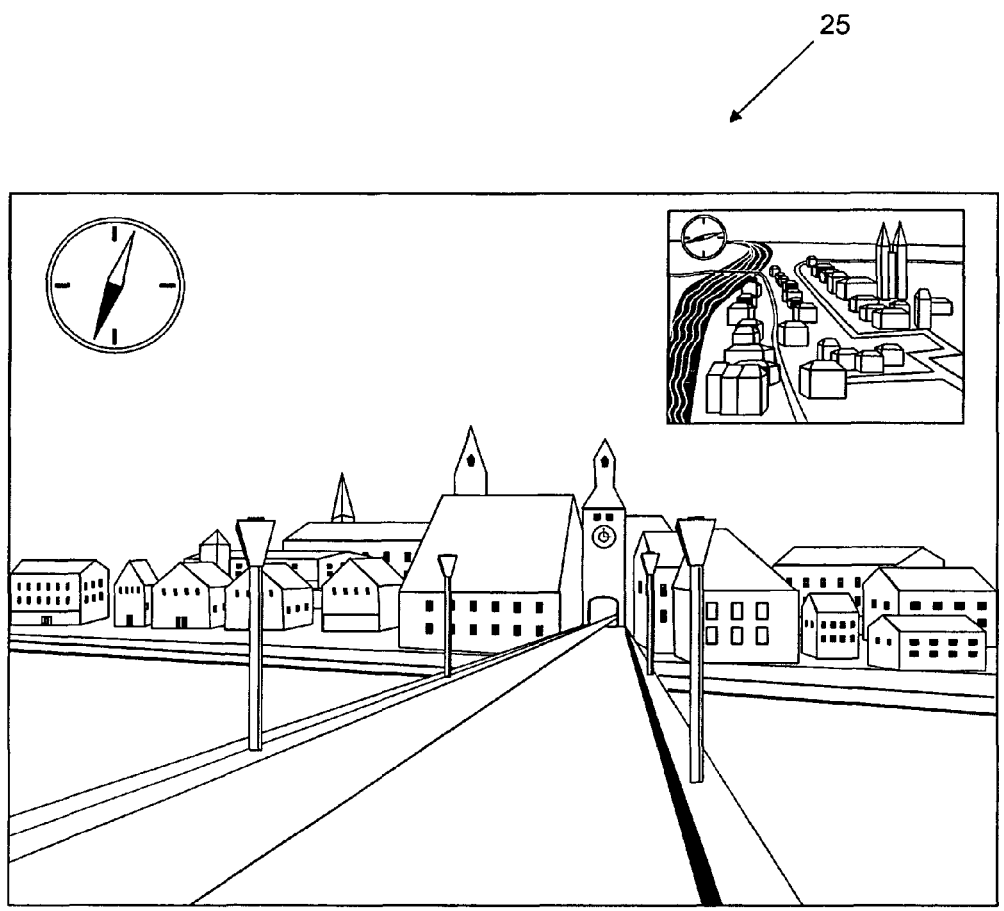
FIG. 4 shows an example of embodiment of a display device.

FIG. 3 shows the principle of an example of embodiment of the motor vehicle 2. The motor vehicle 2 includes a positioning system 23 corresponding to the positioning system 33, a display device 25 corresponding to display device 35 for displaying an image of the environment 9 of the motor vehicle 2 or at least a part of the environment 9 of the motor vehicle 2 and/or for displaying an image of an area around the motor vehicle 2 or at least a part of the area around the motor vehicle 2 depending on the GEO location of the motor vehicle 2 and a database 36 of a 3-dimensional image of an area around the motor vehicle 2 corresponding in principle to the database 26.

The motor vehicle 2 also includes a communications device 37 corresponding in principle to the communications device 27. Via a communications device 37 the communications connection 15 can be established between the motor vehicle 2 and the motor vehicle 1 for transmitting the 3-dimensional image I3D of the environment 8 of the motor vehicle 1 or at least a part of the environment 8 of the motor vehicle 1 to the motor vehicle 2. In addition, a communications connection 17 can be established via a communications device 37 between the motor vehicle 2 and a stationary base station 5 for transmitting a 3-dimensional image of an area around the motor vehicle 2 or at least a part of the area around the motor vehicle 2 from the stationary base station 5 to the motor vehicle 2.

The motor vehicle 2 includes also a navigation module 22 for controlling the display device 35 depending on the position of the motor vehicle 2 and for updating the database 36. For this purpose the process outlined in FIG. 5 or in FIG. 6 is implemented in the navigation module 32. The process pursuant to FIG. 5 begins with a step 40 in which a 3-dimensional image I3D of the environment 8 of the motor vehicle 1 or at least a part of the environment 8 of the motor vehicle 1 received by the motor vehicle 1 and/or a 3-dimensional image of an area around the motor vehicle 2 or at least a part of the area around the motor vehicle 2 is read in.

The step 40 is followed by a query 41 as to whether a corresponding 3-dimensional image of the environment 8 of the motor vehicle 1 or the part of the environment 8 of the motor vehicle 1 or the area around the motor vehicle 2 or the part of the area around the motor vehicle 2 is in the database 36.

If such a 3-dimensional image is in the database 36, the query 41 is followed by query 42 as to whether the 3-dimensional image I3D of the environment 8 of the motor vehicle 1 or at least a part of the environment 8 of the motor vehicle 1 received from the motor vehicle 1 or the 3-dimensional image of the area around the motor vehicle 2 or at least a part of the area around the motor vehicle 2 received from the stationary base station 5 differs from a corresponding image in the database 36. If there is no corresponding 3-dimensional image in the database 36, the query 41 is followed by query 43.

If the 3-dimensional image I3D of the environment 8 of the motor vehicle 1 or at least a part of the environment 8 of the motor vehicle 1 received from the motor vehicle 1 or the 3-dimensional image of the area around the motor vehicle 2 or at least a part of the area around the motor vehicle 2 received from the stationary base station 5 differs from a corresponding image in database 36, query 42 is followed by step 43.

In step 43 the database 36 is updated, i.e. the 3-dimensional image I3D of the environment 8 of the motor vehicle 1 or at least a part of the environment 8 of the motor vehicle 1 received from the motor vehicle 1 or the 3-dimensional image of the area around the motor vehicle 2 or at least a part of the area around the motor vehicle 2 received from the stationary base station 5 is added to the database or a corresponding image in the database 36 is replaced, or is replaced in the parts that need updating, with the 3-dimensional image I3D of the environment 8 of the motor vehicle 1 or at least a part of the environment 8 of the motor vehicle 1 received from the motor vehicle 1 or the 3-dimensional image of the area around the motor vehicle 2 or at least a part of the area around the motor vehicle 2 received from the stationary base station 5.

FIG. 6 shows an example of embodiment of another process that can be implemented in the navigation module 32. Here the steps indicated with the references 50 and 53 basically correspond to the steps 40 and 43 and the queries indicated with the references 51 and 562 essentially correspond to queries 41 and 42.

If the 3-dimensional image I3D of the environment 8 of the motor vehicle 1 or at least a part of the environment 8 of the motor vehicle 1 received from the motor vehicle 1 or the 3-dimensional image of the area around the motor vehicle 2 or at least a part of the area around the motor vehicle 2 received from the stationary base station 5 differs from a corresponding image in database 36, the query 45 as in query 52 is followed by query 54.

Query 54 determines whether the received 3-dimensional image differs from the 3-dimensional image stored in the database in the same way as a 3-dimensional image of the same environment recorded (and transmitted) by another motor vehicle before the waiting period. The waiting period may be 'zero' but is preferably longer than 15 min, in particular longer than 60 min. If the received 3-dimensional image differs from the 3-dimensional image stored in the database in the same way as a 3-dimensional image of the same environment recorded (and transmitted) by another motor vehicle before the waiting period, the query 54 is followed by step 53 corresponding to step 43. Otherwise the query 54 is followed by a step 55 in which the received 3-dimensional image or the difference between this 3-dimensional image and the 3-dimensional image stored in the database 36 is put into temporary storage. Contrary to an updated 3-dimensional image, the 3-dimensional image put into temporary storage cannot be displayed via the display device 36.

Figure 5:
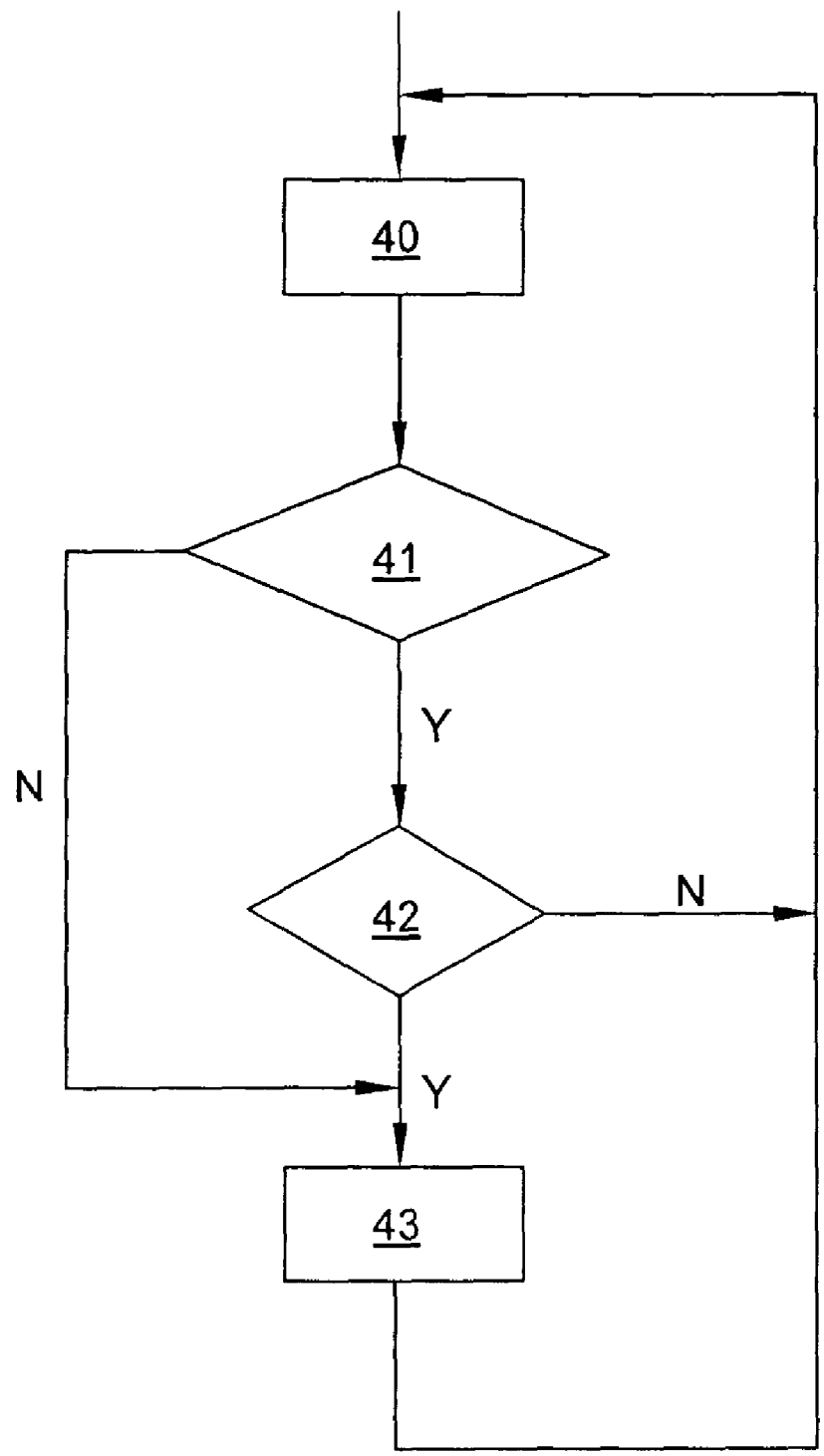
FIG. 5 shows an example of embodiment of a process implemented in a navigation module.
Figure 6:
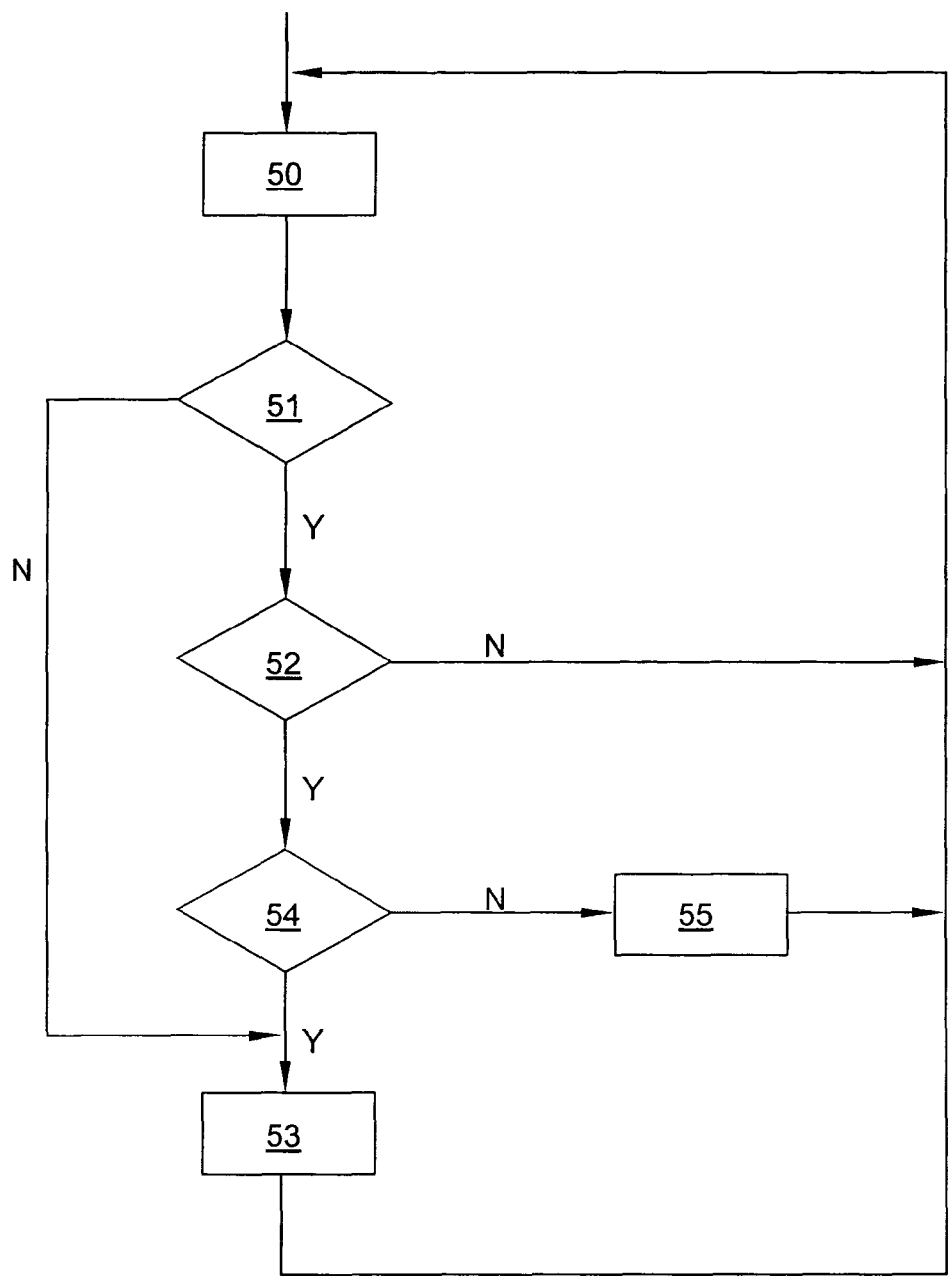
FIG. 6 shows an example of embodiment of another process implemented in a navigation module.

Adjusted accordingly, a process shown in FIG. 5 or a process shown in FIG. 6 for updating the database 26 may also be implemented in the navigation module 22. In this case the 3-dimensional image I3D of the environment 8 of the motor vehicle 1 or at least a part of the environment 8 of the motor vehicle 1 scanned by the environment scanner 20 a 3-dimensional image of the environment of the other motor vehicle or at least a part of the environment of the other motor vehicle received by another motor vehicle and/or a 3-dimensional image of an area around the motor vehicle 2 or at least a part of the area around the motor vehicle 2 received by the stationary base station 5 is read in step 40 or in step 50. The steps 43, 53, 55 and the queries 41, 42, 51, 52, 54 are adjusted accordingly to these data.

An accordingly adjusted process shown in FIG. 5 or in FIG. 6 for updating a database 66, shown in FIG. 1, of the stationary base station 5 may also be implemented in a corresponding navigation module 62 of the stationary base station 5. In this case a 3-dimensional image of the environment of this motor vehicle or at least of a part of the environment of this motor vehicle received from a motor vehicle (e.g. motor vehicle 1) is read in step 40 or step 50. The steps 43, 53, 55 and the queries 41, 42, 51, 52, 54 are adjusted accordingly.

Motor vehicles such as motor vehicle 1 may be commercial motor vehicles such as taxis but also private vehicles.

REFERENCE LIST 1, 2 Motor vehicles
5 Stationary base station
6 Antenna
8, 9 Environment
10, 11, 12, 13 Satellite
15, 16, 17 Communications connection
20 Environment scanner
21 Analyzer
22, 32, 62 Navigation module
23, 33 Positioning system
24 Sensor
25, 35 Display device
26, 36, 66 Database
27, 37 Communications device
28 Bus system
29 Motor vehicle control
40, 43, 50, 53, 55 Step
41, 42, 51, 52, 54 Query
GEO Location of a motor vehicle
I3D Image
v Speed

What is claimed is:

1. A 3-dimensional (3D) navigation system for motor vehicles, comprising:

a first motor vehicle comprising an environment scanner including (a) a sensor configured to collect data regarding the environment around the first motor vehicle, the environment including moving objects and non-moving objects and (b) an analyzer configured to analyze the collected data to distinguish the moving objects from the non-moving objects and generate navigation system display data based on the identified non-moving objects, wherein the navigation system display data represent a displayable image that comprises a perspective view of only the identified non-moving objects in at least a part of the environment around the first motor vehicle and wherein the navigation system display data represent a simplified image of a photographic image;

at least a second motor vehicle;

a communications connection between the first motor vehicle and the second motor vehicle for transmitting the navigation system display data to the second motor vehicle;

a stationary base station;

and a second communications connection between the first motor vehicle and the stationary base station for transmitting the navigation system display data to the stationary base station;

wherein the second motor vehicle comprises:

a communications connection between the second motor vehicle and the stationary base station for transmitting the navigation system display data, a positioning module for determining a current position, and a navigation module configured to display a current position and to receive the navigation system display data from either said first vehicle or said base station and to display said navigation system display data of the current position in form of said displayable image using said navigation system display data.

2. A 3D navigation system according to claim 1, wherein the system combines at least twenty motor vehicles each having an environment scanner for generating navigation system display data that represent a displayable image that comprises a perspective view of the environment around the respective motor vehicle or a perspective view of at least a part of the environment around the respective motor vehicle.

3. A 3D navigation system according to claim 1, wherein the second motor vehicle comprises:

a database stored on a computer readable medium of navigation system display data that represent a displayable image that comprises a perspective view of the environment around the second motor vehicle.

4. A 3D navigation system according to claim 3, wherein the navigation module is configured to update the database after receiving the navigation system display data.

5. A 3D navigation system according to claim 4, wherein the second motor vehicle further comprises:
   a display device for displaying a two-dimensional representation of said perspective view.

6. A 3-dimensional (3D) navigation system for motor vehicles, comprising:
   a combination of at least twenty motor vehicles each having an environment scanner including (a) a sensor configured to collect data regarding the environment around the first motor vehicle, the environment including moving objects and non-moving objects and (b) an analyzer configured to analyze the collected data to distinguish the moving objects from the non-moving objects and generate navigation system display data based on the identified non-moving objects, wherein the navigation system display data represent a displayable image that comprises a perspective view of only the identified non-moving objects in at least a part of the environment around the respective motor vehicle and wherein the navigation system display data represent a simplified image of a photographic image;
   and a communications connection between every motor vehicle and a stationary base station for transmitting the navigation system display data to the stationary base station, wherein the navigation system display data are configured for navigation use in a navigation module of a vehicle.

7. A 3D navigation system according to claim 6, wherein the base station comprises:
   a database stored on a computer readable medium of navigation system display data representing displayable images each comprising a perspective view; and a navigation module for updating the database after receiving navigation system display data representing a displayable image that comprises a perspective view of the environment around a motor vehicle or of a perspective view of at least a part of the environment around the motor vehicle.

8. A 3D navigation system according to claim 6, wherein the base station comprises:
   a database of navigation system display data representing displayable images each comprising a perspective view; and a navigation module for updating the database after receiving data representing a displayable image that comprises a perspective view of an environment around a motor vehicle or a perspective view of at least a part of an environment around the motor vehicle, provided that the received navigation system display data differs from a corresponding navigation system display data representing a displayable image that comprises a perspective view of the same environment around the motor vehicle or a perspective view of at least the same part of the environment around the motor vehicle recorded by another motor vehicle before a certain waiting period and stored in the database.

* * * * *